US012775294B2

(12) United States Patent
Saleem et al.

(10) Patent No.: US 12,775,294 B2

(45) Date of Patent: Oct. 27, 2026

(54) FLOW RATIO CONTROLLERS WITH MASS ACCUMULATION COMPENSATION AND GAS DISTRIBUTION SYSTEMS UTILIZING MASS ACCUMULATION COMPENSATION

(71) Applicant: Illinois Tool Works Inc., Glenview, IL (US)

(72) Inventors: Mohamed Saleem, Fremont, CA (US); Andrew Staudt, Langhorne, PA (US)

(73) Assignee: Illinois Tool Works Inc., Glenview, IL (US)

( * ) Notice: Subject to any disclaimer, the term of this patent is extended or adjusted under 35 U.S.C. 154(b) by 62 days.

(21) Appl. No.: 19/048,438

(22) Filed: Feb. 7, 2025

(65) Prior Publication Data

US 2025/0264892 A1 Aug. 21, 2025

Related U.S. Application Data

(60) Provisional application No. 63/553,960, filed on Feb. 15, 2024.

(51) Int. Cl.
*G05D 11/13* (2006.01)

(52) U.S. Cl.
CPC .................................. *G05D 11/132* (2013.01)

(58) Field of Classification Search
CPC .. G05D 11/132; G05D 11/135; G05D 11/139; G05D 7/0664; Y10T 137/0363; Y10T 137/2529; Y10T 137/265
See application file for complete search history.

(56) References Cited

U.S. PATENT DOCUMENTS

| | | | |
|---|---|---|---|
| 7,621,290 | B2 | 11/2009 | Ding |
| 8,019,481 | B2 | 9/2011 | Yamaguchi |

(Continued)

FOREIGN PATENT DOCUMENTS

| | | |
|---|---|---|
| JP | 2000259255 | 9/2000 |
| JP | 2004533049 | 10/2004 |

(Continued)

OTHER PUBLICATIONS

European Office Communication with extended search report Appln No. 25158087.4 dated Apr. 4, 2025.

(Continued)

*Primary Examiner* — Hailey K. Do

(74) *Attorney, Agent, or Firm* — McAndrews Held & Malloy, Ltd.

(57) ABSTRACT

Disclosed example flow ratio controllers include: an inlet; an inlet pressure sensor; first and second outlets; first and second flow valves; first and second position sensors; first and second outlet pressure sensors; and control circuitry configured to: control the first flow valve and the second flow valve based on a predetermined flow ratio for the first outlet and the second outlet, an inlet pressure, the first valve position, the second valve position, the first outlet pressure, (Continued)

and the second outlet pressure; determine a rate of change of the inlet pressure based on measurements from the inlet pressure sensor; and based on the inlet pressure and the rate of change of the inlet pressure, control the first flow valve and the second flow valve to maintain the inlet pressure within a predetermined range of a predetermined inlet pressure.

17 Claims, 4 Drawing Sheets

(56) References Cited

U.S. PATENT DOCUMENTS

| | | | | |
|---|---|---|---|---|
| 9,760,096 | B2 | 9/2017 | Ellec | |
| 10,269,600 | B2 | 4/2019 | Brashear | |
| 10,698,426 | B2 * | 6/2020 | Ding | G05D 7/0664 |
| 11,187,561 | B2 * | 11/2021 | Ding | G01F 1/42 |
| 12,306,644 | B2 * | 5/2025 | Gundlach | G01F 15/005 |
| 2006/0272703 | A1 | 12/2006 | Lull | |
| 2019/0204857 | A1 * | 7/2019 | Yasuda | G05D 7/0664 |
| 2022/0129020 | A1 | 4/2022 | Gundlach | |

FOREIGN PATENT DOCUMENTS

| | | |
|---|---|---|
| JP | 2015531137 | 10/2015 |
| JP | 2021105992 | 7/2021 |

OTHER PUBLICATIONS

Atmanand M A et al.: "A Novel Method of Using a Control Valve for Measurement and Control of Flow", IEEE Transactions on Instrumentation and Measurement, IEEE, USA, vol. 48, No. 6, Dec. 1, 1999 (Dec. 1, 1999), P011024860, ISSN: 0018-9456.

Furuya Motohiro: "Development of Control Valve for Flow Measurement and Flow Control", Jan. 1, 2009 (Jan. 1, 2009), XP093263527, Retrieved from the Internet: URL:https://us.azbil.com/wp-content/uploads/2016/05/activalplus-whitepaper.pdf.

Leephakpreeda Thananchai: "Flow-sensorless control valve: neural computing approach", Flow Measurement and Instrumentation., vol. 14, No. 6, Dec. 1, 2003 (Dec. 1, 2003), pp. 261-266, XP093263522, GB ISSN: 0955-5986.

Choi Jeongju: "Flow control system design without flow meter sensor", Sensors and Actuators A: Physical, vol. 185, Oct. 1, 2012 (Oct. 1, 2012), pp. 127-131, XP093263516, NL ISSN: 0924-4247.

* cited by examiner

402

400

FLOW RATIO CONTROLLERS WITH MASS ACCUMULATION COMPENSATION AND GAS DISTRIBUTION SYSTEMS UTILIZING MASS ACCUMULATION COMPENSATION

RELATED APPLICATIONS

The present application claims the benefit of U.S. Provisional Patent Application Ser. No. 63/553,960, filed Feb. 15, 2024, entitled "FLOW RATIO CONTROLLERS WITH MASS ACCUMULATION COMPENSATION AND GAS DISTRIBUTION SYSTEMS UTILIZING MASS ACCUMULATION COMPENSATION." The entirety of U.S. Provisional Patent Application Ser. No. 63/553,960 is expressly incorporated herein by reference.

FIELD OF THE DISCLOSURE

This disclosure is directed generally to flow control and, more particularly, to flow ratio controllers with mass accumulation compensation and gas distribution systems utilizing mass accumulation compensation.

BACKGROUND

Flow ratio controllers receive a flow of one or more gases, and distribute the flow among multiple outputs according to defined ratios.

SUMMARY

Flow ratio controllers with mass accumulation compensation and gas distribution systems utilizing mass accumulation compensation are disclosed, substantially as illustrated by and described in connection with at least one of the figures, as set forth more completely in the claims.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

The figures are not necessarily to scale. Wherever appropriate, similar or identical reference numerals are used to refer to similar or identical components.

DETAILED DESCRIPTION

Figure 1:
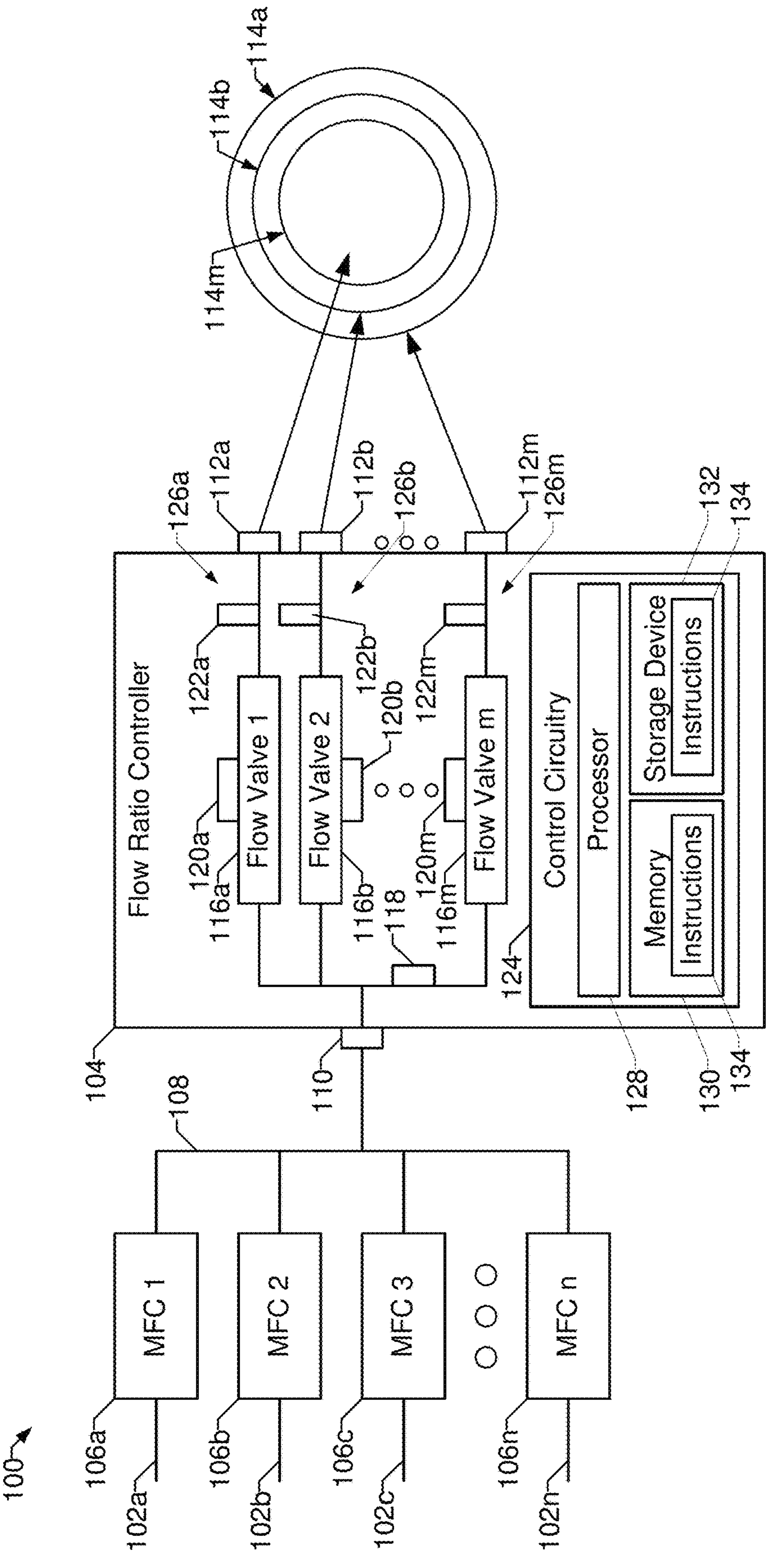
FIG. 1 is a block diagram of an example gas distribution system including multiple sources of gases and a flow ratio controller for controlled distribution of the gases, in accordance with aspects of this disclosure.

For the purpose of promoting an understanding of the principles of the claimed technology and presenting its currently understood, best mode of operation, reference will be now made to the embodiments illustrated in the drawings and specific language will be used to describe the same. It will nevertheless be understood that no limitation of the scope of the claimed technology is thereby intended, with such alterations and further modifications in the illustrated device and such further applications of the principles of the claimed technology as illustrated therein being contemplated as would typically occur to one skilled in the art to which the claimed technology relates.

Flow ratio controllers are used in applications such as semiconductor manufacturing to deliver precise ratios of gases to different regions of a wafer. Such semiconductor manufacturing applications benefit from faster response times, repeatability of results, and consistency of results, in addition to cost-effectiveness. Conventional flow ratio controllers include inlet pressure sensors and outlet pressure sensors for each channel, as well as mass flow meters and control valves which can result in errors in the flow ratio distribution due to differences between the sensors.

Disclosed example flow ratio controllers provide improved stability and accuracy compared with conventional flow ratio controllers, as well as improved response times to changing flow rates. Disclosed example flow ratio controllers use piezoelectric valves and an inlet pressure sensor that is shared between all of the outlet channels of the flow ratio controller to provide accurate, repeatable gas distribution to multiple channels without the use of flow sensors for flow detection. Instead, disclosed examples use valve flow models, inlet and outlet pressure sensors, and valve position sensors to determine the flow through each channel.

Disclosed example flow ratio controllers include: an inlet configured to receive a input process gas flow; an inlet pressure sensor configured to measure an inlet pressure of the input process gas flow; a first outlet configured to output a first portion of the input process gas flow; a second outlet configured output a second portion of the input process gas flow; a first flow valve configured to control a flow of the input process gas to the first outlet; a second flow valve configured to control a flow of the input process gas to the second outlet; a first position sensor configured to measure a first valve position of the first flow valve; a first outlet pressure sensor configured to measure a first outlet pressure of the first outlet; a second position sensor configured to measure a second valve position of the second flow valve; a second outlet pressure sensor configured to measure a second outlet pressure of the second outlet; and control circuitry configured to: control the first flow valve and the second flow valve based on a predetermined flow ratio for the first outlet and the second outlet, the inlet pressure, the first valve position, the second valve position, the first outlet pressure, and the second outlet pressure; determine a rate of change of the inlet pressure based on measurements from the inlet pressure sensor; and based on the inlet pressure and the rate of change of the inlet pressure, control the first flow valve and the second flow valve to maintain the inlet pressure within a predetermined range of a predetermined inlet pressure.

In some example flow ratio controllers, the control circuitry is configured to: determine, without a flow meter, a first flow rate at the first outlet based on the inlet pressure, the first outlet pressure, and the first valve position; determine, without a flow meter, a second flow rate at the second outlet based on the inlet pressure, the second outlet pressure, and the second valve position; and control at least one of the first flow valve and the second flow valve based on the first flow rate, the second flow rate, and the predetermined flow ratio. In some example flow ratio controllers, the control circuitry is configured to: control the first flow valve to create a choked flow condition through the first flow valve while the first flow valve is open; and control the second flow valve to create a choked flow condition through the second flow valve while the second flow valve is open.

In some example flow ratio controllers, the first flow valve includes a first loss region in series with a second loss region, and the control circuitry is configured to control the first flow valve based on calculating a first laminar flow through the first loss region and calculating a first choked flow through the second loss region. In some example flow ratio controllers, the second flow valve includes a third orifice and a fourth orifice, and the control circuitry is configured to control the second flow valve based on calculating a second laminar flow through the third orifice and calculating a second choked flow through the fourth orifice.

In some example flow ratio controllers, the first flow valve and the second flow valve each include a piezoelectric valve. In some example flow ratio controllers, each of the first position sensor and the second position sensor includes a capacitive position sensor, a strain gauge position sensor, a Hall effect position sensor, or an optical position sensor. Some example flow ratio controllers further include a manifold configured to distribute the input process gas flow to the first flow valve and the second flow valve, wherein the inlet pressure sensor is configured to measure the inlet pressure in the manifold.

Disclosed example precision gas distribution systems include: a plurality of mass flow controllers configured to control flow of respective gases to respective outlets; and a flow ratio controller configured to: receive the gases from the mass flow controllers via an inlet; and control delivery of respective portions of the gases to a plurality of outlets of the flow ratio controller according to a predetermined flow ratio for the plurality of outlets by controlling a plurality of flow valves based on an inlet pressure at the inlet, valve positions of the plurality of flow valves, and outlet pressures of the plurality of outlets; and determine a rate of change of the inlet pressure based on measurements from an inlet pressure sensor; and based on the inlet pressure and the rate of change of the inlet pressure, control the plurality of flow valves to maintain the inlet pressure within a predetermined range of a predetermined inlet pressure.

In some example precision gas distribution systems, the flow ratio controller includes: the inlet pressure sensor configured to measure the inlet pressure of an input process fluid flow comprising the gases at the inlet, in which the plurality of outlets include a first outlet configured to output a first portion of the input process gas flow and a second outlet configured output a second portion of the input process gas flow, and the plurality of flow valves include a first flow valve configured to control a flow of the input process gas to the first outlet and a second flow valve configured to control a flow of the input process gas to the second outlet. The flow ratio controller further includes: a first position sensor configured to measure a first valve position of the first flow valve; a first outlet pressure sensor configured to measure a first outlet pressure of the first outlet; a second position sensor configured to measure a second valve position of the second flow valve; a second outlet pressure sensor configured to measure a second outlet pressure of the second outlet; and control circuitry configured to control the first flow valve and the second flow valve based on a predetermined flow ratio for the first outlet and the second outlet, the inlet pressure, the first valve position, the second valve position, the first outlet pressure, and the second outlet pressure.

In some example precision fluid distribution systems, the control circuitry is configured to: control the first flow valve to create a sonic flow condition through the first flow valve while the first flow valve is open; and control the second flow valve to create a sonic flow condition through the second flow valve while the second flow valve is open. In some example precision fluid distribution systems, the first flow valve includes a first loss region in series with a second loss region, and the control circuitry is configured to control the first flow valve based on calculating a first laminar flow through the first loss region and calculating a first sonic flow through the second loss region. In some example precision fluid distribution systems, the first flow valve and the second flow valve each include a piezoelectric valve. In some example precision fluid distribution systems, each of the first position sensor and the second position sensor includes at least one of a capacitive position sensor, a strain gauge position sensor, a Hall effect position sensor, or an optical position sensor.

In some examples, the flow ratio controller includes three or more flow valves including the first flow valve and the second flow valve, each of the three or more flow valves having an orifice, a position sensor, and an outlet pressure sensor, wherein the control circuitry is configured to calculate flow through each of the three or more flow valves and control each of the three or more flow valves to satisfy a pre-determined split ratio.

Some example precision fluid distribution systems further include a manifold configured to distribute the input process fluid flow to the first flow valve and the second flow valve, wherein the inlet pressure sensor is configured to measure the inlet pressure in the manifold. Some example precision fluid distribution systems further include a temperature sensor configured to measure a temperature of the input process gas flow, and the control circuitry is configured to control the first and second flow valves based on the temperature.

FIG. 1 is a block diagram of an example gas distribution system 100 including multiple sources of gases 102*a*-102*n*, and a flow ratio controller 104 for controlled distribution of the gases 102*a*-102*n*, such as a predetermined mixture of two or more of the gases 102*a*-102*n*. The gases 102*a*-102*n* may be different types of process gases, such as process gases for semiconductor manufacturing.

The example gas distribution system 100 includes a set of mass flow controllers 106*a*-106*n*, which control respective flow rates for each of the gases 102*a*-102*n*. The mass flow controllers 106*a*-106*n* output the respective gases 102*a*-102*n* to a manifold 108, or other mixing volume, and fed into an inlet 110 of the flow ratio controller 104.

The example flow ratio controller 104 of FIG. 1 receives respective portions of an inlet process gas flow (e.g., the gases 102*a*-102*n*) via the inlet 110 (e.g., as a mixture), and controls delivery of the input process gas flow to a set of outlets 112*a*-112*m*. As disclosed in more detail below, the flow ratio controller 104 controls delivery of the input process gas flow according to a predetermined flow ratio for the set of outlets 112*a*-112*m* by controlling a set of flow valves using a valve flow model and based on an inlet pressure at the inlet 110, valve positions of the plurality of flow valves, and outlet pressures of the plurality of outlets

112*a*-112*m*. The inlet 110 and the outlets 112*a*-112*m* may be any single type or combination of types of disconnectable or permanent gas connection, such as a threaded connection, quick-connect connection, welded or soldered connection, and/or any other appropriate type(s) of connection(s). The outlets 112*a*-112*m* may be coupled (e.g., via hoses, pipes, ducts, and/or any other rigid, semi-rigid, and/or flexible lines) to corresponding outlet locations 114*a*-114*m* to which the input process gas flow is to be output.

The example flow ratio controller 104 includes a set of flow valves 116*a*-116*m*, each of which controls flow from the shared inlet 110 to a corresponding outlet 112*a*-112*m*. The inlet pressure at the inlet 110, which is also the inlet pressure at the inlets to the flow valves 116*a*-116*m*, is measured via an inlet pressure sensor 118. As discussed in more detail below with reference to FIG. 2, each of the flow valves 116*a*-116*m* includes a position sensor 120*a*-120*m* to measure a valve position of the corresponding flow valve 116*a*-116*m*.

In some examples, the flow ratio controller 104 includes a manifold to distribute the input process gas flow to the first flow valve and the second flow valve, wherein the inlet pressure sensor is configured to measure the inlet pressure in the manifold.

Each of the gas paths from the inlet 110 to one of the outlets 112*a*-112*m* is referred to herein as an "outlet channel." Each outlet channel 126*a*-126*m* includes the corresponding flow valve 116*a*-116*m* (having the corresponding position sensor 120*a*-120*m*), the corresponding outlet 112*a*-112*m*, and a corresponding outlet pressure sensor 122*a*-122*m*. The outlet pressure sensor 122*a*-122*m* measures an outlet pressure of the corresponding outlet 112*a*-112*m* (e.g., between an outlet of the flow valve 116*a*-116*m* and the outlet 112*a*-112*m*).

The example flow ratio controller 104 further includes control circuitry 124 to control the flow valves 116*a*-116*m* to output the gases to two or more of the outlet channels 126*a*-126*m*. The example control circuitry 124 may be an integrated processing system, a programmable logic controller, a general-purpose computer, a laptop computer, a tablet computer, and/or any other type of processing system configured to communicate with the sensors 120*a*-120*m*, 122*a*-122*m* and flow valves 116*a*-116*m* of the flow ratio controller 104. For example, the control circuitry 124 includes a processor 128, memory 130, and a storage device 132. The example processor 128 may be any general purpose central processing unit (CPU) from any manufacturer. In some other examples, the processor 128 may include one or more specialized processing units, such as RISC processors with an ARM core, graphic processing units, digital signal processors, and/or system-on-chips (SoC). The processor 128 executes machine readable instructions 134 that may be stored locally at the processor (e.g., in an included cache or SoC), in the memory (e.g., a random access memory or other volatile memory, a read only memory or other non-volatile memory such as FLASH memory, and/or in the storage device 132. The example storage device 132 may be a hard drive, a solid state storage drive, a hybrid drive, a RAID array, and/or any other mass data storage device.

In the example of FIG. 1, the control circuitry 124 uses a predetermined (e.g., stored, received) flow ratio to control the flow valves 116*a*-116*m*. The predetermined flow ratio may be stored in the memory 130 and/or the storage device 132, and/or received at the processor from an external control system (e.g., via communication circuitry).

In the example of FIG. 1, the flow ratio controller 104 does not have flow sensors to directly measure the outlet flow through the outlet channels 126*a*-126*m*. Instead, the example control circuitry 124 controls the flow valves 116*a*-116*m* according to one or more valve flow models. The valve flow model(s) may be stored in a memory or other storage device of the control circuitry 124. An example valve flow model that may be used by the control circuitry 124 relates valve position, inlet pressure, outlet pressure, and flow for each example flow valve 116*a*-116*m*. The control circuitry 124 may use different valve flow models for different flow valves 116*a*-116*m* due to, for example, the different flow valves 116*a*-116*m* having different configurations.

The example flow ratio controller 104 further includes a temperature sensor 136 to measure a temperature of the gas received via the inlet 110, and/or multiple temperature sensors configured to measure the temperatures of the gases distributed through the flow valves 116*a*-116*m*. While in many cases the temperatures of the gases distributed to the different outlet channels 126*a*-126*m* are substantially equal, the control circuitry 124 may use the measured temperature(s) to compensate or correct the flow rates and/or pressure changes.

Figure 2:
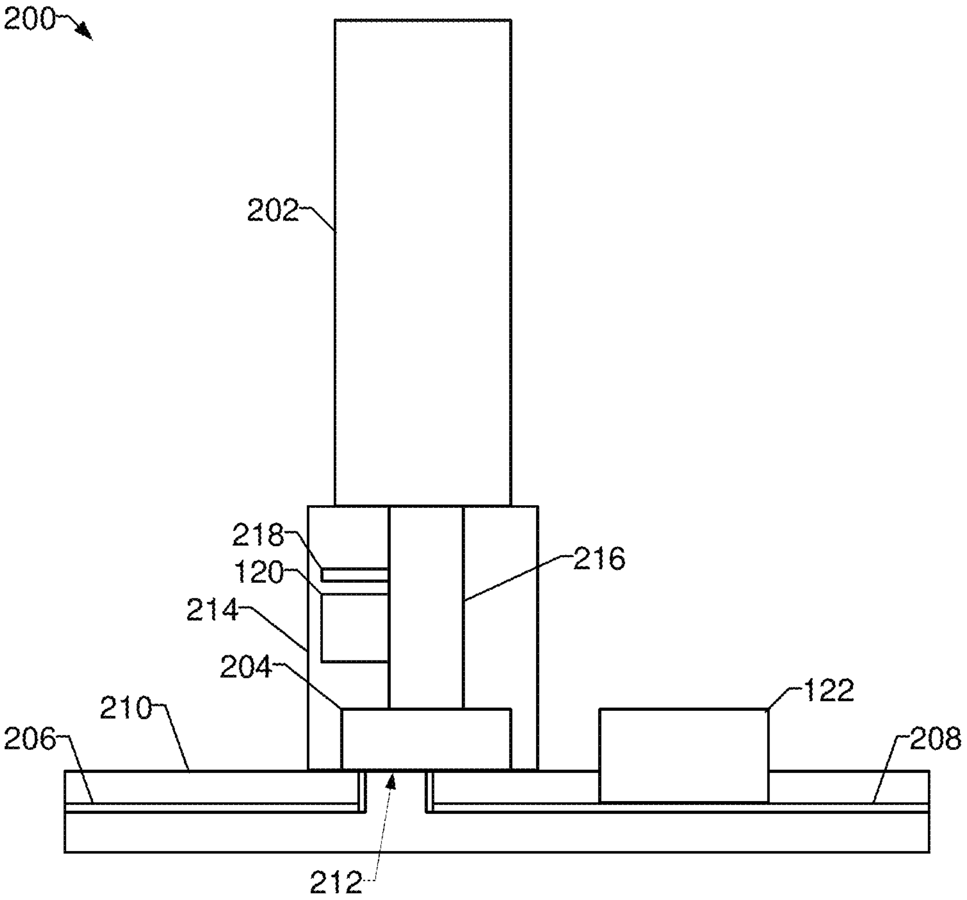
FIG. 2 is a schematic diagram of an example flow valve which may be used to implement each of the flow valves in the flow ratio controller of FIG. 1.

FIG. 2 is a schematic diagram of an example flow valve 200 which may be used to implement each of the flow valves 116*a*-116*m* in the flow ratio controller 104 of FIG. 1. The example flow valve 200 of FIG. 2 is a piezoelectric-type of valve, which includes a stacked piezoelectric actuator 202 coupled to a control plate 204 to control a size of a gas pathway between a valve inlet 206 (e.g., coupled to the inlet 110 of FIG. 1) and a valve outlet 208 (e.g., coupled to the outlet 112) in a base 210. The valve inlet 206 and valve outlet 208 are selectively coupled via a flow channel 212 within a housing 214 of the flow valve 200.

The example piezoelectric flow valve 200 is a normally-opened valve which, in the event of a power loss, allows the gases to be vented into the desired location instead of being trapped within the gas distribution system 100. In other examples, the flow valve 200 is a normally-closed valve.

The flow channel 212 is adjustable by controlling the piezoelectric actuator 202 to move the control plate 204. For example, the control plate 204 may be moved away from the base 210 to increase a size of the flow channel 212 and moved toward the base 210 to decrease the size of the flow channel 212 and/or close the flow channel 212.

The piezoelectric actuator 202 is coupled to the control plate 204 via a stem 216, a rod, or other rigid coupling. To detect a position of the flow valve 200, the example position sensor 120 detects a distance between the position sensor 120 and a target 218 coupled to the stem 216. As the stem 216 is actuated to move by the piezoelectric actuator 202, the target 218 moves toward and away from the position sensor 120. The position sensor 120 may be a capacitive position sensor, a strain gauge position sensor, an optical position sensor, a Hall effect sensor, and/or any other type of position sensor, and the target 218 may be a type of target that is suitable for the type of position sensor 120.

Figure 3:
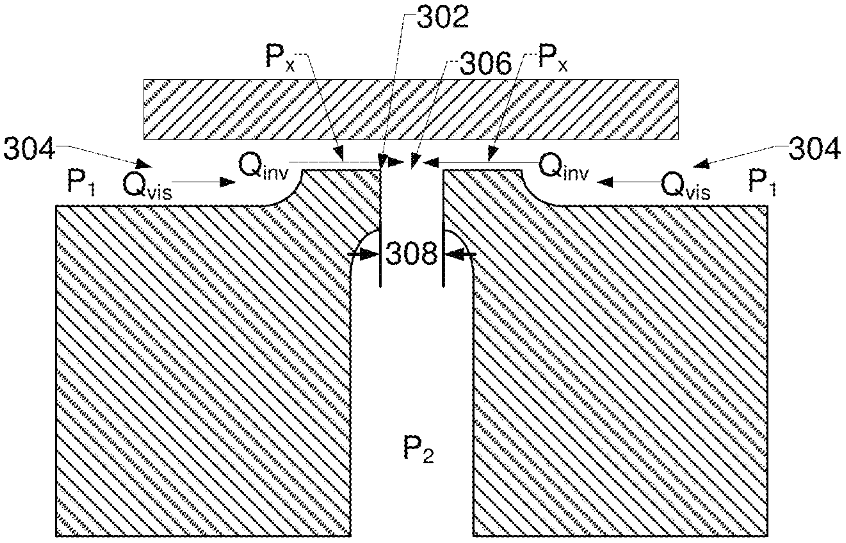
FIG. 3 depicts the elements of a flow model which may be used by the control circuitry of FIG. 1 to control the flow valve of FIG. 2 and/or determine flow through the flow valve without the use of a dedicated flow meter.

The example control circuitry 124 may include multiple elements in the flow model for the valve 200. For example, the flow model may represent multiple sources of flow constraint, such as a first pressure loss region (e.g., a viscous flow region) and a second loss region (e.g., an inviscid flow region). FIG. 3 depicts the elements of a flow model which may be used by the control circuitry 124 of FIG. 1 to control the flow valve 200 of FIG. 2 and/or determine flow through the flow valve without the use of a dedicated flow meter.

The flow valve 200 and the elements 302-308 of FIGS. 2 and 3 may be duplicated for each of the example flow valves 116*a*-116*m* of FIG. 1.

As illustrated in FIG. 3, the distance between the control plate 204 and a valve seat 302 controls a size of a viscous flow region 304 and a size of an inviscid flow region 306. The example inviscid flow region 306 may include an orifice 308 which can be different between different ones of the flow valves 116*a*-116*m* of FIG. 1.

The control circuitry 124 determines a flow rate through the valve 200 by determining a flow rate through the viscous flow region 304 and the inviscid flow region 306 based on the position of the valve 200 (e.g., the position of the control plate 204 as measured by the position sensor 120), based on the inlet pressure (e.g., measured by the inlet pressure sensor 118 of FIG. 1), the outlet pressure (e.g., measured by the outlet pressure sensor 122 coupled to the valve outlet 208), a size of the orifice 308, and the qualities of the gas being transmitted (e.g., viscosity of the gas, temperature, gas density).

The control circuitry 124 determines a first pressure drop across the viscous flow region 304 using Equation 1 to determine an intermediate pressure $P_x$ and a corresponding flow rate $Q_{vis}$.

$$Q_{vis} = \frac{(P_1^2 - P_x^2)wH^3}{12 \cdot \mu LRT} \quad \text{(Equation 1)}$$

In Equation 1, $Q_{vis}$ is the mass flow rate through the viscous flow region 304, $P_1$ is the inlet pressure (as measured by the inlet pressure sensor 118), $P_x$ is the intermediate pressure between the viscous flow region 304 and the inviscid flow region 306, H is the distance between the control plate 204 and the valve seat 302, μ is the dynamic viscosity of the gas, w is the breadth of the viscous flow region 304, and L is the length of the flow path of the viscous flow region 304, and R is the gas constant.

The control circuitry 124 further determines a second pressure drop across the inviscid flow region 306 using Equation 2 (for a sonic flow condition) or Equation 3 (for sub-sonic flow conditions).

$$Q_{inv} = C_d \frac{T_{ref}}{P_{ref}} \pi * Dia * h * P_x \sqrt{\frac{2R_u}{MWT_{act}}\left(\frac{k}{k-1}\right)\left[\left(\frac{P_2}{P_x}\right)^{\frac{2}{k}} - \left(\frac{P_2}{P_x}\right)^{\frac{k+1}{k}}\right]} \quad \text{(Equation 2)}$$

$$Q_{inv} = C_d \frac{T_{ref}}{P_{ref}} \pi * Dia * h * P_x \sqrt{\frac{2R_u}{MWT_{act}}}\left(\frac{k}{k-1}\right)^{\frac{k+1}{k-1}} \quad \text{(Equation 3)}$$

In Equations 2 and 3, $C_d$ is the discharge coefficient, k is a gas-specific heat ratio, M is the gas molecular weight, T is the gas temperature, Dia is the diameter 308 of the orifice, $T_{ref}$ is a reference temperature, $P_{ref}$ is a reference pressure, $R_u$ is a universal gas constant and h is the distance between the control plate 204 and the valve seat 302.

Sonic flow occurs when the condition expressed in Equation 4 is true.

$$\frac{P_2}{P_1} \le \left(\frac{2}{k+1}\right)^{\frac{k}{k-1}} \quad \text{(Equation 4)}$$

During sonic flow, a standing shock wave is formed which limits the flow rate through an orifice despite further increases in the upstream pressure relative to downstream pressure. By operating the flow valve 200 in the sonic flow condition, the control circuitry 124 can more reliably determine the flow rate through the flow valve 200.

Using Equations 1-4, the control circuitry 124 determines an intermediate pressure value $P_x$ for which $Q_{vis}$ and $Q_{inv}$ are equal based on the measured values of $P_1$ (the inlet pressure) and $P_2$ (the outlet pressure for that channel 126). The flow rate at which $Q_{vis}$ and $Q_{inv}$ are equal for the same value of the intermediate pressure $P_x$ is the flow rate through the valve 200 and, therefore, through the corresponding outlet channel.

In some examples, the control circuitry 124 controls the flow valves 116*a*-116*m* to operate consistently in the sonic flow condition when the flow valve 116*a*-116*m* is open, such as by controlling the pressure drop across the flow valve 200 to satisfy Equation 4. In some other examples, the control circuitry 124 may control the flow valves 116*a*-116*m* to operate in a sub-sonic flow condition. However, operation in the sub-sonic flow condition may require additional computational effort by the control circuitry 124.

Figure 4B:
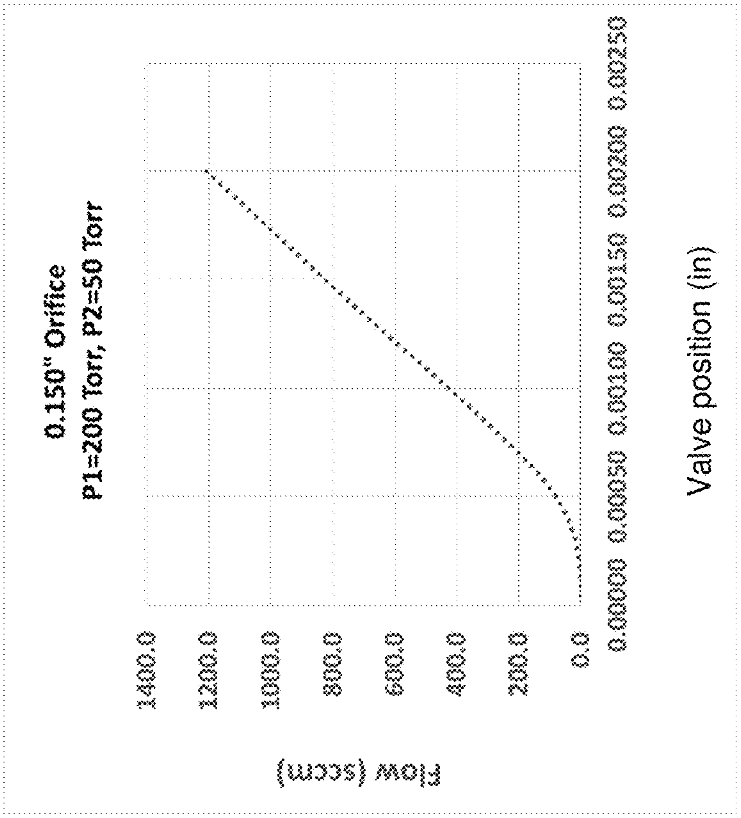
FIGS. 4A and 4B are graphs of example valve flow models that may be used by the control circuitry of FIG. 1 to control the flow valve of FIG. 2 and/or determine flow through the flow valve without the use of a dedicated flow meter.
Figure 4A:
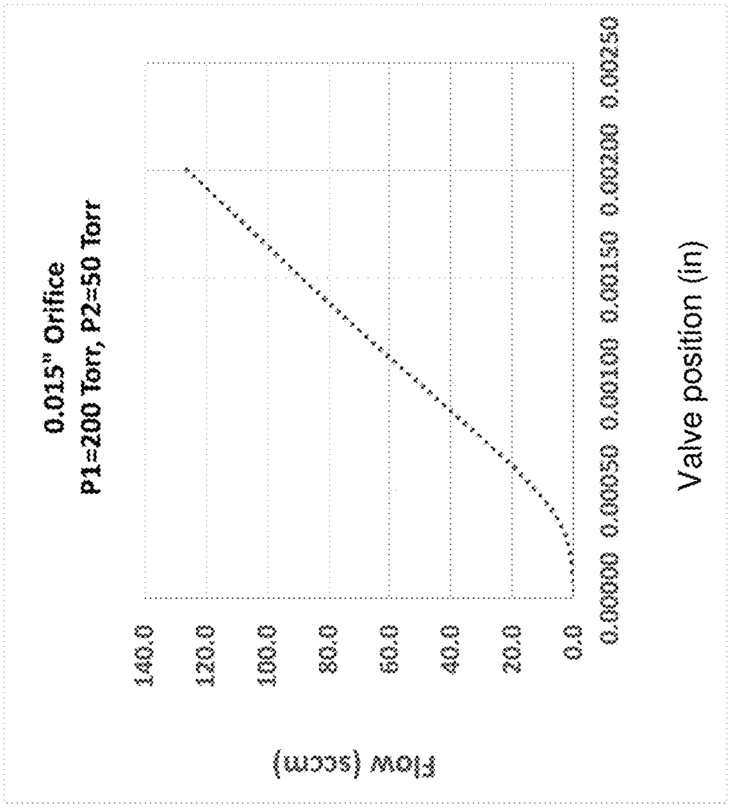

FIGS. 4A and 4B are graphs of example valve flow models 400, 402 that may be used by the control circuitry 124 of FIG. 1 to control the flow valve 200 of FIG. 2 and/or determine flow through the flow valve 200 without the use of a dedicated flow meter. For example, the valve flow models 400, 402 may be stored in a database in the memory 130 and/or the storage device 132 of FIG. 1. The example valve flow model 400 relates valve position (e.g., the distance between the control plate 204 and the valve seat 302) to the flow through the valve 200 for a given orifice size, inlet pressure, and outlet pressure. Similarly, the valve flow model 400 relates valve position to the flow through the valve 200 for a larger orifice size, inlet pressure, and outlet pressure. The example memory 130 and/or storage device 132 of FIG. 1 may include additional sets of inlet pressures and outlet pressures for each orifice size, and/or sets of flow rates for different combinations of valve position, inlet pressures, and outlet pressures for each orifice size present in the set of flow valves 116*a*-116*m*.

Returning to FIG. 1, in some examples, the control circuitry 124 is further configured to compensate for inlet pressure changes caused by changes in the inlet flow from the gases 102*a*-102*n* (e.g., via the MFCs 106*a*-106*n*). In conventional flow control systems, changes in flow result in corresponding changes in inlet pressure as gas mass accumulates in the pipes, ducts, manifolds, and/or other gas carriers. Conventional systems, which respond to stable pressures, may be required to wait a significant time before responding to perform any necessary flow control adjustments, thereby reducing the response time of the entire gas distribution system.

The example control circuitry 124 improves the response time when changes in flow rates occur at the inlet 110 by monitoring both the inlet pressure (measured by the inlet pressure sensor 118) and determining the rate of change of the inlet pressure based on the measurements by the inlet pressure sensor 118. If the rate of change of the inlet pressure increases above a predetermined threshold, the control circuitry 124 responds to maintain the inlet pressure within a predetermined range of a predetermined inlet pressure. The predetermined inlet pressure may be a pressure determined by the control circuitry 124 to maintain a sonic flow condition through the flow valves 116*a*-116*m* (e.g., using Equation 4) and/or any other target pressure determined by the control circuitry 124 to obtain the desired flow ratio. In some examples, the predetermined range of the rate of change of the inlet pressure is selected to avoid changes due to noise but to retain sufficient sensitivity to pressure changes caused by changes in flow rate.

For example, if the MFCs 106*a*-106*n* increase the flow rate (e.g., due to a change in process or recipe), the resulting increase in flow will cause a corresponding increase in pressure measured by the inlet pressure sensor 118. The control circuitry 124 detects that the rate of change of the inlet pressure is increasing, and determines a corresponding change to the position of each of the flow valves 116*a*-116*m* to maintain both the predetermined flow ratio and the target pressure. For example, for a higher rate of change of the pressure, the control circuitry 124 may determine a larger change in valve position. Conversely, for a lower rate of change of the pressure, the control circuitry may determine a smaller change in valve position.

Figure 5:
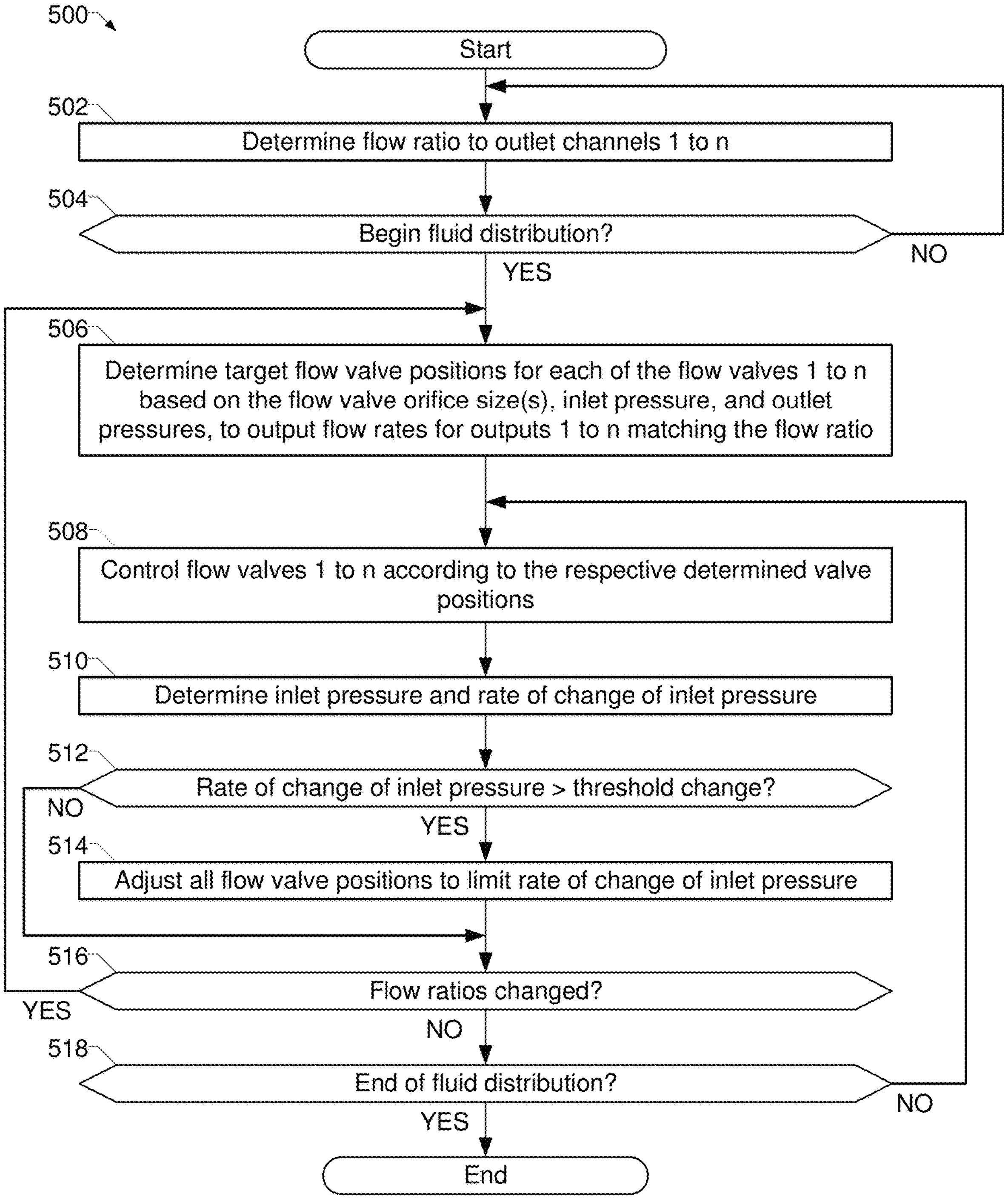
FIG. 5 is a flowchart representative of example machine readable instructions which may be executed to implement the control circuitry of FIG. 1 to provide controlled distribution of gases.

FIG. 5 is a flowchart representative of example machine readable instructions 500 which may be executed to implement the control circuitry 124 of FIG. 1 to provide controlled distribution of gases from the outlet channels 126*a*-126*m*. The example instructions 500 will be described below with reference to the gas distribution system 100 of FIG. 1 and the valve 200 of FIG. 2.

At block 502, the control circuitry 124 determines a flow ratio for the outlet channels 126*a*-126*m*. The flow ratio may be stored in the memory 130 or storage device 132, and/or received via an I/O interface and/or communications circuitry.

At block 504, the control circuitry 124 determines whether to begin gas distribution. For example, the control circuitry 124 may detect that an input process gas flow is being received from the MFCs 106*a*-106*n* based on changes in the inlet pressure (e.g., measured by the inlet pressure sensor 118). If gas distribution is not yet to begin (block 504), control returns to block 502.

When gas distribution begins (block 504), at block 506 the control circuitry 124 determines target flow valve positions for each of the flow valves 116*a*-116*m*, based on the flow valve orifice size(s), the inlet pressure, and the target outlet pressures, to output the target flow rates for each of the outlet channels 126*a*-126*m* matching the flow ratio. For example, the control circuitry 124 may reference the valve flow models 400, 402 and/or the Equations 1-4 to set the desired flow rates for each outlet channel specified in the flow ratios, such that the total flow through the outlet channels 126*a*-126*m* is equal to the flow at the inlet 110. In some examples, the control circuitry 124 may control the flow valves 116*a*-116*m* to set a sonic flow condition to reduce the complexity of calculations of the target valve positions.

At block 508, the control circuitry 124 controls the flow valves 116*a*-116*m* according to the respective determined valve positions. For outlet channels 126*a*-126*m* which are not used, the control circuitry 124 controls the corresponding flow valve 116*a*-116*m* to be closed. The control circuitry 124 may use closed-loop control of the piezoelectric actuators 202 based on position feedback from the position sensors 120*a*-120*m* to control the flow valves 116*a*-116*m* to the correct valve positions.

At block 510, the control circuitry 124 determines an inlet pressure and a rate of change of the inlet pressure. For example, the control circuitry 124 may receive inlet pressure data from the inlet pressure sensor 118, and calculate the rate of change of the inlet pressure. At block 512, the control circuitry 124 determines whether the inlet pressure and/or the rate of change are more than a threshold. If the rate of change of the inlet pressure is more than the threshold (block 512), at block 514 the control circuitry 124 adjusts the flow valve positions of all of the open flow valves 116*a*-116*m* to limit the rate of change of the inlet pressure. For example, the flow valve positions are adjusted to maintain the predetermined flow ratio at each of the outlet channels 126*a*-126*m* and to reduce the settling time for a change in flow rate.

After adjusting the flow valve positions (block 514), or if the rate of change of the inlet pressure is not greater than the threshold (block 512), at block 516 the control circuitry 124 determines whether the flow ratio has changed. If the flow ratio has changed (block 516), control returns to block 506 to determine new target flow valve positions.

If the flow ratio has changed (block 516), at block 518 the control circuitry 124 determines whether gas distribution is to end. If gas distribution is to continue (block 518), control returns to block 508 to continue controlling the flow valves 116*a*-116*m*. When gas distribution is to end (block 518), the example instructions 500 end.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations.

While the present method and/or system has been described with reference to certain implementations, it will be understood by those skilled in the art that various changes may be made, and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A flow ratio controller, comprising:

an inlet configured to receive a input process gas flow;

an inlet pressure sensor configured to measure an inlet pressure of the input process gas flow;

a first outlet configured to output a first portion of the input process gas flow;

a second outlet configured output a second portion of the input process gas flow;

a first flow valve configured to control a flow of the input process gas to the first outlet;

a second flow valve configured to control a flow of the input process gas to the second outlet;

a first position sensor configured to measure a first valve position of the first flow valve;

a first outlet pressure sensor configured to measure a first outlet pressure of the first outlet;

a second position sensor configured to measure a second valve position of the second flow valve;

a second outlet pressure sensor configured to measure a second outlet pressure of the second outlet; and control circuitry configured to:

control the first flow valve and the second flow valve based on a predetermined flow ratio for the first outlet and the second outlet, the inlet pressure, the first valve position, the second valve position, the first outlet pressure, and the second outlet pressure;

determine a rate of change of the inlet pressure based on measurements from the inlet pressure sensor; and based on the inlet pressure and the rate of change of the inlet pressure, control the first flow valve and the second flow valve to maintain the inlet pressure within a predetermined range of a predetermined inlet pressure.

2. The flow ratio controller as defined in claim 1, wherein the control circuitry is configured to:

determine, without a flow meter, a first flow rate at the first outlet based on the inlet pressure, the first outlet pressure, and the first valve position;

determine, without a flow meter, a second flow rate at the second outlet based on the inlet pressure, the second outlet pressure, and the second valve position; and control at least one of the first flow valve and the second flow valve based on the first flow rate, the second flow rate, and the predetermined flow ratio.

3. The flow ratio controller as defined in claim 1, wherein the control circuitry is configured to:

control the first flow valve to create a choked flow condition through the first flow valve while the first flow valve is open; and control the second flow valve to create a choked flow condition through the second flow valve while the second flow valve is open.

4. The flow ratio controller as defined in claim 1, wherein the first flow valve and the second flow valve each comprise a piezoelectric valve.

5. The flow ratio controller as defined in claim 1, wherein each of the first position sensor and the second position sensor comprises a capacitive position sensor, a strain gauge position sensor, a Hall effect position sensor, or an optical position sensor.

6. The flow ratio controller as defined in claim 1, further comprising a manifold configured to distribute the input process gas flow to the first flow valve and the second flow valve, wherein the inlet pressure sensor is configured to measure the inlet pressure in the manifold.

7. The flow ratio controller as defined in claim 1, wherein the flow ratio controller comprises three or more flow valves including the first flow valve and the second flow valve, each of the three or more flow valves having an orifice, a position sensor, and an outlet pressure sensor, wherein the control circuitry is configured to calculate flow through each of the three or more flow valves and control each of the three or more flow valves to satisfy a pre-determined split ratio.

8. The flow ratio controller as defined in claim 1, wherein the first flow valve comprises a first loss region in series with a second loss region, wherein the control circuitry is configured to control the first flow valve based on calculating a first laminar flow through the first loss region and calculating a first choked flow through the second loss region.

9. The flow ratio controller as defined in claim 8, wherein the second flow valve comprises a third loss region and a fourth loss region, wherein the control circuitry is configured to control the second flow valve based on calculating a second laminar flow through the third loss region and calculating a second choked flow through the fourth loss region.

10. A precision gas distribution system, comprising:

a plurality of mass flow controllers configured to control flow of respective gases to respective outlets; and a flow ratio controller configured to:

receive the gases from the plurality of mass flow controllers via an inlet; and control delivery of respective portions of the gases to a plurality of outlets of the flow ratio controller according to a predetermined flow ratio for the plurality of outlets by controlling a plurality of flow valves based on an inlet pressure at the inlet, valve positions of the plurality of flow valves, and outlet pressures of the plurality of outlets; and determine a rate of change of the inlet pressure based on measurements from an inlet pressure sensor; and based on the inlet pressure and the rate of change of the inlet pressure, control the plurality of flow valves to maintain the inlet pressure within a predetermined range of a predetermined inlet pressure.

11. The precision gas distribution system of claim 10, wherein the flow ratio controller comprises:

the inlet pressure sensor configured to measure the inlet pressure of an input process fluid flow comprising the gases at the inlet;

wherein the plurality of outlets comprise a first outlet configured to output a first portion of the input process gas flow and a second outlet configured output a second portion of the input process gas flow;

wherein the plurality of flow valves comprise a first flow valve configured to control a flow of the input process gas to the first outlet and a second flow valve configured to control a flow of the input process gas to the second outlet, the flow ratio controller further comprising:

a first position sensor configured to measure a first valve position of the first flow valve;

a first outlet pressure sensor configured to measure a first outlet pressure of the first outlet;

a second position sensor configured to measure a second valve position of the second flow valve;

a second outlet pressure sensor configured to measure a second outlet pressure of the second outlet; and control circuitry configured to control the first flow valve and the second flow valve based on a predetermined flow ratio for the first outlet and the second outlet, the inlet pressure, the first valve position, the second valve position, the first outlet pressure, and the second outlet pressure.

12. The precision fluid distribution system of claim 11, wherein the control circuitry is configured to:

control the first flow valve to create a sonic flow condition through the first flow valve while the first flow valve is open; and control the second flow valve to create a sonic flow condition through the second flow valve while the second flow valve is open.

13. The precision fluid distribution system of claim 11, wherein the first flow valve comprises a first loss region in series with a second loss region, wherein the control circuitry is configured to control the first flow valve based on calculating a first laminar flow through the first orifice and calculating a first sonic flow through the second orifice.

14. The precision fluid distribution system of claim 11, wherein the first flow valve and the second flow valve each comprise a piezoelectric valve.

15. The precision fluid distribution system of claim 11, wherein each of the first position sensor and the second position sensor comprises at least one of a capacitive position sensor, a strain gauge position sensor, a Hall effect position sensor, or an optical position sensor.

16. The precision fluid distribution system of claim 11, further comprising a manifold configured to distribute the input process fluid flow to the first flow valve and the second flow valve, wherein the inlet pressure sensor is configured to measure the inlet pressure in the manifold.

17. The precision fluid distribution system of claim 11, further comprising a temperature sensor configured to measure a temperature of the input process gas flow, the control circuitry configured to control the first and second flow valves based on the temperature.

* * * * *